US008616253B2

(12) United States Patent
Castellini (10) Patent No.: US 8,616,253 B2
(45) Date of Patent: Dec. 31, 2013

(54) TYRE FOR VEHICLE WHEELS

(75) Inventor: Alessandro Castellini, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 489 days.

(21) Appl. No.: 12/808,629

(22) PCT Filed: Dec. 19, 2007

(86) PCT No.: PCT/IB2007/004031
§ 371 (c)(1),
(2), (4) Date: Jun. 16, 2010

(87) PCT Pub. No.: WO2009/077807
PCT Pub. Date: Jun. 25, 2009

(65) Prior Publication Data
US 2010/0307651 A1        Dec. 9, 2010

(51) Int. Cl.
*B60C 11/12*        (2006.01)
(52) U.S. Cl.
USPC ................................. 152/209.18; 162/DIG. 3
(58) Field of Classification Search
USPC .......... 152/209.1, 209.2, 209.3, 209.8, 209.9, 152/209.15, 209.18, 209.21, 209.24, 152/209.25, 209.27, 902, DIG. 3
See application file for complete search history.

(56) References Cited

U.S. PATENT DOCUMENTS

| 7,077,180 B2 * | 7/2006 | Kuze ........................ 152/209.18 |
| 2003/0201048 A1 | 10/2003 | Radulescu et al. |
| 2007/0095447 A1 | 5/2007 | Nguyen et al. |

FOREIGN PATENT DOCUMENTS

| EP | 1 669 217 A1 | 6/2006 | |
| JP | 10-129218 | 5/1998 | |
| JP | 11-151914 | * 6/1999 | ............. B60C 11/11 |
| JP | 11-165508 | 6/1999 | |

OTHER PUBLICATIONS

Consolidated Resolution on the Construction of Vehicles (R.E.3), Economic and Social Council, Economic Commission for Europe, Inland Transport Committee, Working Party on the Construction of Vehicles, Trans/Wp.29/78/Rev.1, pp. 1-112, (1997).
International Search Report from the European Patent Office for International Application No. PCT/IB2007/004031, mailed Apr. 25, 2008.

* cited by examiner

*Primary Examiner* — Eric Hug
(74) *Attorney, Agent, or Firm* — Finnegan, Henderson, Farabow, Garrett & Dunner, L.L.P.

(57) ABSTRACT

A tire for vehicle wheels, in particular for heavy load vehicle wheels, has a tread band including an annular central portion astride an equatorial plane and two annular shoulder portions arranged on axially opposite sides with respect to the annular central portion. The annular central portion is separated from a respective annular shoulder portion by a respective circumferential groove. The annular central portion includes a plurality of blocks arranged along at least one circumferential row between two circumferential grooves and at least one transversal sipe arranged between two circumferentially consecutive blocks. The transversal sipe has a main surface oriented in a substantially radial direction and provided with at least one deformation defining, in the adjacent blocks, respective portions of mutual constraint. The deformation has an overall decreasing width from an axial end of the sipe to a central zone thereof and has a radial extension smaller than that of the aforementioned main surface.

25 Claims, 9 Drawing Sheets

TYRE FOR VEHICLE WHEELS

CROSS REFERENCE TO RELATED APPLICATION

This application is a national phase application based on PCT/IB2007/004031, filed Dec. 19, 2007, the content of which is incorporated herein by reference.

BACKGROUND OF THE INVENTION

1. Field of the Invention

The present invention relates to a tyre for vehicle wheels, in particular for heavy load vehicle wheels.

The invention also relates to a tread band for one such a tyre, in particular a premoulded tread band for covering worn tyres.

2. Description of the Related Art

A tyre for vehicle wheels intended to be used on heavy load vehicles generally comprises at least one carcass structure comprising a structure ply formed by reinforcing cords embedded in an elastomeric matrix. The carcass ply has end edges respectively engaged with annular anchoring structures. The latter are arranged in the zones of the tyre usually identified with the name of "beads" and normally consist each of an annular substantially circumferential insert on which at least one filling insert is applied, in radially outer position thereof. Such annular anchoring structures are commonly identified as "bead cores" and have the task of keeping the tyre well fixed to the anchoring seat specifically provided in the wheel rim, thus preventing, in operation, the radially inner end edge of the tyre coming out from such seat.

At the beads specific reinforcing structures may be provided having the function of improving the torque transmission to the tyre.

In a radially outer position with respect to the carcass ply, a belt structure comprising one or more belt layers is associated, said belt layers being arranged radially one of top of the other and having textile or metal reinforcing cords with crossed orientation and/or substantially parallel to the direction of circumferential extension of the tyre.

In a radially outer position with respect to the belt structure a tread band is applied, made from elastomeric material as well.

On the side surfaces of the carcass structure respective sidewalls of elastomeric material are also applied, each one extending from one of the side edges of the tread band up to the respective annular anchoring structure to the beads.

As is known, the tyres intended to be used on heavy load vehicles are typically required to have optimal traction capability, acceleration, directionality and controllability characteristics, even on snowy or wet road surfaces.

Another characteristic typically required to the tyres is a limited, and/or as much as possible uniform, wear, so as to increase the performances of the tyres in terms of kilometric yield and reduce the running and vibrations on travel.

The aforementioned characteristics in part contrast with each other. In particular, in practice it is not possible to ensure optimal performances in terms of traction capability, acceleration, controllability and directionality without in some manner affecting the tyre performances in terms of kilometric yield and noise/vibrations.

The tyre performances on travel considerably depend on the design of the tread band thereof.

Typically, the tread band of a tyre comprises an annular central portion astride the equatorial surface of the tyre and two annular shoulder portions arranged on axially opposite sides with respect to the aforementioned annular central portion and separated from the latter by respective circumferential groove.

The tread band moreover comprises a plurality of grooves and sipes arranged transversally and circumferentially in order to define a tread design. The aforementioned grooves and sipes define a plurality of blocks in the tread design.

The circumferential and transversal sipes typically have a shape such to define, in the adjacent blocks, respective mutual embedding or constraining portions, both in circumferential direction and in axial direction. The embedding in the circumferential direction contributes to give stability to the tyre, above all in the travel direction, while the embedding in the axial direction contributes to confer stability to the tyre particularly in the lateral direction. Such stability is essentially given by the lesser mobility of the blocks in the ground-contacting area of the tyre due to the mutual abutment between contiguous blocks caused by the closure of the sipes.

Throughout the present description and in the subsequent claims, the term: "block", is used to indicate a tread band portion delimited by consecutive grooves or sipes both in an axial and circumferential direction, the "groups of block" being instead circumferentially delimited by two subsequent transversal grooves and formed by a number of blocks which are circumferentially aligned and separated by transversal sipes.

Throughout the present description and in subsequent claims, the terms: "grooves" and "sipes", are used to indicate channels formed in the tread band of the tyre, the transversal and circumferential sipes having a width, respectively in a circumferential and transversal direction, lower than the width in a circumferential and transversal direction of the transversal and circumferential grooves.

Throughout the present description and in the subsequent claims, moreover, the terms: "axial" and "axially", are used to indicate a direction substantially orthogonal to the equatorial plane of the tyre, i.e. a direction substantially parallel to the rotation axis of the tyre. The terms: "radial" and "radially", are instead used to indicate a direction substantially orthogonal to the rotation axis of the tyre and lying on a plane passing through such rotation axis, while the terms: "circumferential" and "circumferentially", are used to indicate a direction substantially parallel to the equatorial plane of the tyre along the annular extension thereof.

Throughout the present description and in the subsequent claims, the expression: "ground-contacting area of the tyre", is used to indicate the portion of the peripheral surface of the tread band in contact with the road surface.

While the circumferential grooves affect the behaviour of the tyre in terms of lateral stability and directionality, the transversal grooves affect the behaviour of the tyre in terms of traction capability and acceleration. The circumferential and transversal grooves moreover affect the water removal in the ground-contacting area of the tyre while running over wet road surfaces, reducing the aquaplaning phenomena.

A high contribution in terms of traction capability and acceleration is given to the tyre by the grip fronts defined on the tread band by the transversal sipes. Such sipes also contribute, in case of wet road surface, to the water removal.

In the case of snowy road surface, the transversal sipes among other things ensure the trapping of the snow in the ground-contacting area of the tyre, so as to make on travel a contact between tyre and road surface of snow/snow type, such a type of contact being desired as it confers greater traction capability to the tyre. In fact, during the rolling of the tyre, the transversal sipes entering the ground-contacting area of the tyre are closed due to the mobility of the blocks under the ground-contacting area of the tyre, in such a manner trapping the snow, to then be opened by exiting the ground-contacting area of the tyre.

Throughout the present description and subsequent claims, the terms: "entering" and "exiting", are used to indicate—with reference to the ground-contacting area of the tyre and with regard to the structural characteristics of the blocks of the tread band (or of the transversal sipes)—those portions of the blocks which are first stressed or are the first entering in, contact with the road surface during the rolling of the tyre (or the transversal sipes adjacent to such block portions) and, respectively, the block portions which are last stressed or are the last abandoning the contact with the road surface (or the transversal sipes adjacent to those block portions).

US 2007/0095447 discloses a tread band for tyres provided with groups of block delimited by circumferential and transversal grooves, such groups of blocks being in turn provided with sipes with a variable profile in a radial and axial direction. In particular, the profile of these sipes varies in an axial direction with a sinusoidal progression having a constant pitch, while in radial direction it varies between a radially outer portion of the groups of blocks wherein the sipe has, in a circumferential direction, a predetermined width and a radially inner portion of the groups of blocks wherein the sipe has, always in a circumferential direction, a greater width.

EP 1 669 217 discloses a tread band for winter tyres, comprising a plurality of groups of blocks defined between a plurality of circumferential grooves and a plurality of transversal grooves. Each group of blocks comprises a plurality of transversal sipes having a profile with a substantially zigzag progression both in the axial direction and radial direction.

US 2003/0201048 discloses a tread band for winter tyres, comprising a plurality of blocks defined between transversal grooves, each block comprising a sipe of lower width than that of the transversal grooves and depth substantially equal to that of the transversal grooves. The sipe has a profile with a substantially zigzag progression both in the axial direction and radial direction.

SUMMARY OF THE INVENTION

The Applicant observed that a high number of transversal sipes having a shape such as to define, in the adjacent blocks, mutual embedding portions, if on one hand can be advantageous for the improvement of the tyre performances in terms of traction capability, acceleration, snow trapping, water removal and lateral stability, on the other hand can lead to a decline of the tyre performances in terms of kilometric yield, as well as the rise of disturbing vibrations and noise due to the excessive and/or irregular wear of the tread band.

The Applicant is convinced that such decline of the tyre performances occurs particularly due to the continuous mutual friction of the walls of the adjacent blocks during opening and closing of the transversal sipes, respectively in the steps of exiting from, and entering in, the ground-contacting area of the tyre. On the other hand, the Applicant is convinced that, in order to enhance the performances of the tyre in terms of lateral stability, traction capability and acceleration on snowy or wet surfaces, and water removal on wet surfaces, it is advantageous to make use of transversal sipes having a profile such as to permit an adequate mutual embedding of the adjacent blocks and a sufficient opening and closing of the sipe at the ground-contacting area of the tyre.

In order to satisfy the aforementioned partly contrasting needs, the Applicant has designed a tread design comprising appropriately shaped transversal sipes in order to achieve the embedding between the adjacent blocks only at zones of the blocks where it has been found to be advantageous to have the embedding, so as to obtain the desired performances of the tyre in terms of lateral stability, traction capability and acceleration on snowy or wet surfaces and water removal on wet surfaces. In such design, the profile of the transversal sipe is such that the opening of the transversal sipes exiting from the ground-contacting area of the tyre is in some manner controlled, so as to limit as much as possible the friction of the walls of the adjacent blocks and thus limit the wear of the tread band, in this manner increasing the kilometric yield of the tyre and reducing the possibility that undesired noise and vibrations rise.

In particular, the Applicant has found that it is possible to obtain a tyre having optimal characteristics, either in terms of traction capability, acceleration, snow trapping, water removal and lateral stability, and in terms of kilometric yield and wear, using a tread design comprising transversal sipes having a profile such that the embedding between the adjacent blocks occurs in an accentuated manner at the axially outer portions of the blocks and is progressively reduced moving towards the centre of the sipe, and wherein the opening of the sipes occurs only up to a certain point, such an opening being afterwards obstructed by the mutual contact of the walls of the adjacent blocks.

The present invention therefore relates, in a first aspect thereof, to a tyre for vehicle wheels having a tread band comprising an annular central portion astride an equatorial plane and two annular shoulder portions arranged on axially opposite sides with respect to the annular central portion, the annular central portion being separated from each annular shoulder portion by a respective circumferential groove, wherein the annular central portion comprises a plurality of blocks, arranged along at least one circumferential row comprised between two circumferential grooves, and at least one transversal sipe adapted to define two circumferentially consecutive blocks, wherein the transversal sipe has a main surface oriented in a substantially radial direction and provided with at least one deformation defining, in the adjacent blocks, respective portions of mutual constraint, wherein said deformation has an overall decreasing width from an axial end of the sipe to a central zone thereof and wherein said deformation has a radial extension lower than that of said main surface.

Throughout the present description and in the subsequent claims, the term: "deformation", is used to indicate, with reference to a main surface of the transversal sipe, a deviation from such main surface, along an inclined direction with respect to said surface, such as for example a substantially circumferential direction, having a radial extension lower than that of the transversal sipe.

Throughout the present description and in the subsequent claims, with the expression: "overall decreasing width from one axial end of the sipe to a central zone thereof", it is meant that, considering any position P between that end and that central zone, it is possible to identify an interval $I_0$ of axial extension E around such position P such that the average width in a circumferential direction of the deformation in the interval $I_0$ is greater than the average width in circumferential direction of the deformation in any interval $I_n$ having the same axial extension E and placed closer to the central zone of the sipe with respect to the interval $I_0$.

Such definition, therefore, covers the condition for which the width of the deformation is simply decreasing from the axial end of the sipe to the central zone thereof, as well as the condition for which the width of the deformation is variable in an oscillating manner from a minimum to a maximum in intervals I between the axial end and the central zone and at least said maximums are decreasing from the axial end of the sipe to the central zone thereof.

Advantageously, the transversal sipe of the tyre of the present invention has a profile such that the mutual constraint between the adjacent blocks is progressively reducing from the axially outer zone of the sipe moving towards the centre of the sipe. The opening of the sipe in the exiting step from the ground-contacting area is therefore greater at the central zone thereof, and is progressively reducing towards the axial end thereof. A sufficiently wide sack is therefore produced in the central zone of the sips so as to permit the trapping and maintaining of the snow—thus attaining the desired performances of the tyre in terms of traction capability and acceleration on snowy road surfaces and water removal on wet road surfaces. Moreover, a mutual constraint between the circumferentially consecutive blocks at the axially outer zone of the sipe is obtained which is sufficiently strong to stiffen the lateral fronts of the blocks of the tread band, thus attaining the desired performances of the tyre in terms of lateral stability.

In addition thereof, the particular profile of the transversal sipe of the tyre of the present invention allows, in the exiting step from the tyre ground-contacting area, preventing the opening of the sipes beyond a certain limit. This limit is reached when the walls of the mutual constraining portions of the blocks adjacent to the sipe come into contact with each other, mutually obstructing each other. A controlled opening of the sipes is therefore obtained, with a consequent reduction of the wear caused by the mutual friction of the walls of the adjacent blocks in the opening and closing step of the sipe. Thus, it follows that an increase of the kilometric yield of the tyre and an attenuation of the problems related to undesired noise and vibrations is attained.

The tyre of the present invention is particularly adapted to be used in driving wheels of heavy load vehicles, but it can also be conveniently used in the directional wheels of such vehicles.

In a second aspect thereof, the present invention relates to a tread band for a tyre for vehicle wheels comprising an annular central portion astride an equatorial plane and two annular shoulder portions arranged on axially opposite sides with respect to the annular central portion, the annular central portion being separated from each annular shoulder portion by a respective circumferential groove, wherein the annular central portion comprises a plurality of grooves, arranged along at least one circumferential row comprised between two circumferential grooves, and at least one transversal sipe adapted to define two circumferentially consecutive blocks, wherein the transversal sipe has a main surface oriented in a substantially radial direction and provided with at least one deformation defining, in the adjacent blocks, respective portions of mutual constraint, wherein said deformation has an overall decreasing width from an outer end of the sipe to a central zone thereof and wherein said deformation has a radial extension lower than that of said main surface.

Advantageously, such a tread band can be used as a pre-moulded tread band for covering worn tyres of heavy load vehicles wheels.

The present invention, in at least one of the aforementioned aspects, can have at least one of the following preferred characteristics.

In some embodiments of the present invention, the main surface of the transversal sipe is substantially flat.

In preferred embodiments of the present invention, such main surface comprises a deviated portion at the central zone thereof. Advantageously, the deviated portion define a constraint between the circumferentially consecutive blocks against the lateral stresses of the same row, giving lateral stability to the tyre, and increases the surface extension of the central zone of the sipe, allowing a greater snow accumulation in such a zone of the sipe.

Preferably, a radially outer portion of the main surface of the transversal sipe is not affected by the aforementioned deformation. At the outer surface of the tread band, therefore, no embedding occurs between the circumferentially consecutive blocks; in this zone, the maximum opening of the sipe is thus achieved, this being advantageous for the snow trapping.

Preferably, the central zone of the main surface of the transversal sipe is not affected by the aforementioned deformation. At the centre of the sipe, therefore, no embedding occurs between the circumferentially consecutive blocks; in this zone, therefore, the maximum opening of the sipe is achieved, which can then trap the snow.

Preferably, the deformation of the main surface of the sipe extends radially more outwardly, proceeding from the end of the sipe towards the central zone thereof. Advantageously, the surface extension of the embedding between the circumferentially consecutive blocks is in such a manner increased, axial extension of the sipe being equal, with evident advantages in terms of lateral stability of the tyre.

In the preferred embodiments of the present invention, the deformation of the main surface of the sipe comprises at least one bent portion with a progressively decreasing width from the end of the sipe to the central zone thereof.

In some preferred embodiments, the deformation of the main surface of the sipe comprises a pair of bent portions placed side by side, which are radially spaced apart from one other and extended on a same side of the main surface of the sipe. Advantageously, the provision of more bent portions allows improving the embedding between the blocks, with important advantages in terms of lateral stability of the tyre.

In other preferred embodiments, the deformation of the main surface of the sipe comprises a pair of bent sections placed side by side, which are radially spaced apart from one other and extended on opposite sides of the main surface of the sipe.

In further preferred embodiments, the deformation of the main surface comprises a pair of bent portions placed side by side, which are radially contiguous and extended on opposite sides of the main surface of the sipe.

In some particularly preferred embodiments, the deformation of the main surface comprises two pairs of bent portions placed side by side, each pair comprising two bent portions which are radially contiguous and extended on opposite sides of the main surface of the sipe, the two pairs being radially spaced apart from one other.

Preferably, the two bent portions have different circumferential width. More preferably, the radially innermost bent portion has a width lower than that of the radially outer bent portion. In this manner, a greater embedding is achieved at the radially outer portions of the sipe and a lower embedding is achieved at the radially inner portions of the sipe. Such configuration is particularly advantageous considering the fact that, when the tyre is new, the radial extension and the mobility of the blocks is high and there is the maximum opening of the sipe. It is thus convenient in these conditions to have the maximum embedding between the walls of the circumferentially consecutive blocks. As the tread band is worn, the radial extension and mobility of the blocks is reduced; in these conditions it is advantageous to have a lower embedding.

In some alternative embodiments of the present invention, the deformation of the main surface of the transversal sipe comprises a succession of embossed portions having a decreasing width from the end of the sipe towards the central zone thereof. The form of the embossed portions can be of various type, for example prismatic, pyramid, circular, conical etc.

In particularly preferred embodiments of the present invention, the main surface of the transversal sipe comprises at least two deformations, each one extended from one of the axial ends of the transversal sipe to the central zone. Advantageously, the embedding of the circumferentially consecutive blocks is in this case achieved at both axial ends of the blocks, further improving the tyre performances in terms of lateral stability.

Preferably, the deformations of the main surface of the transversal sipe which extend from opposite ends are provided at radially offset positions, attaining in this manner a further advantageous stiffening of the tyre against the lateral stresses.

In all the preferred embodiments of the present invention, the deformation of the main surface of the transversal sipe can be advantageously defined by a curved surface. In this manner the presence of corners is avoided, which can cause undesired tension concentrations, irregular wear problems and extractions problems of the sipe from the mould.

Preferably, the tread band of the tyre of the present invention comprises, in the annular central portion thereof, at least two circumferential rows of blocks, such rows being axially separated by a circumferential sipe. Advantageously, the circumferential sipe gives stability to the tyre in the travel direction.

Preferably, the tread band comprises a first circumferential groove astride the equatorial surface of the tyre and two second circumferential grooves arranged on axially opposite sides with respect to the first circumferential groove, the circumferential rows of blocks being arranged between the first circumferential groove and each of the second circumferential grooves.

The particular design of the tread band described above can be applied both in winter tyres and in city tyres.

Preferably, in the case of winter tyres, the tread band comprises groups of blocks separated by transversal grooves. Advantageously, such grooves define grip fronts which give to the tyre greater traction capability and acceleration on snowy or wet road surfaces, and allow an improved snow trapping and water removal.

Preferably, the aforementioned blocks have an elongated shape in the axial direction.

Preferably, the groups of blocks of one circumferential row are at offset circumferential positions with respect to the groups of blocks of the axially adjacent circumferential row, in order to give an improved lateral stability to the tyre.

Preferably, each of the two annular shoulder portions comprises sipes of identical shape to, and different sizes of, the sipes of the annular central portion of the tread band.

On the other hand, in the case of city tyres, a transversal sipe is provided between each block of a circumferential row and the circumferentially consecutive block.

Preferably, the blocks have in this case an elongated shape in the circumferential direction.

Preferably, the blocks of a circumferential row are at offset circumferential positions with respect to the blocks of the axially adjacent circumferential row, in order to give an improved lateral stability to the tyre.

BRIEF DESCRIPTION OF THE DRAWINGS

Further characteristics and advantages of the present invention will be clearer from the following detailed description of some preferred embodiments of a tyre in accordance with the present invention, made with reference to the attached drawings. In such drawings.

DETAILED DESCRIPTION OF THE INVENTION

Figure 1:
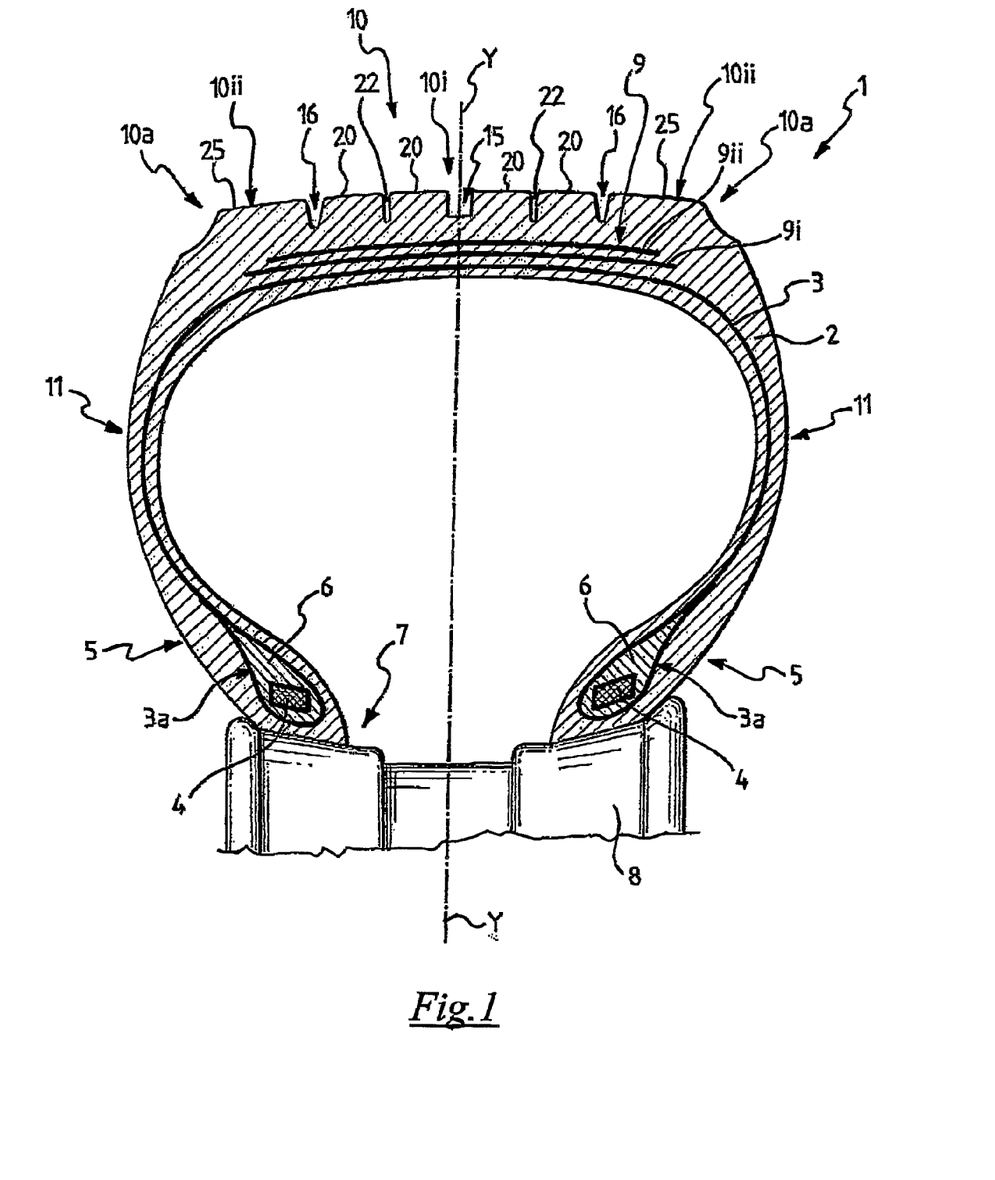
FIG. 1 shows a cross sectional view, made along the line I-I of FIG. 2, of a first embodiment of a tyre according to the invention.

In FIG. 1, a tyre for vehicle wheels according to the present invention, in particular a tyre intended to be used in the driving wheels of a heavy load vehicle, is on the whole indicated with 1.

Throughout the present description and in subsequent claims, the expression "heavy load vehicle", is used to indicate a vehicle belonging to the categories M2~M3, N2~N3 and O2~O4 defined in "Consolidated Resolution on the Construction of Vehicles (R.E.3) (1997)", Annex 7, pages 52-59, "Classification and definition of power-driven vehicles and trailers", such as for example trucks, lorries, tractor trailers, buses, large vans and other vehicles of this type.

The tyre 1 comprises a carcass structure 2, including at least one carcass ply 3 formed by reinforcing cords embedded in an elastomeric matrix.

The carcass ply 3 has opposite end edges 3a engaged with respective bead cores 4. The latter are situated in the zones 5 of the tyre 1 normally identified with the name of "beads".

On the outer perimeter edge of the bead cores 4, an elastomeric filling 6 is applied which occupies the space defined between the carcass ply 3 and the respective end edge 3a of the carcass ply 3. The bead cores 4 maintain the tyre 1 well fixed to the anchoring seat 7 which is specifically provided in the wheel rim 8, thus preventing in operation the bead 5 coming out from such seat 7.

Specific reinforcing structures (not illustrated) can be provided at the beads 5, having the function of improving the torque transmission to the tyre 1.

A belt structure 9 is associated to the carcass ply 2 in a radially outer position thereof and preferably comprises a number of belt layers (in the specific illustrated example, two layers 9i, 9ii are shown) arranged radially one on top of the other and having textile or metal reinforcing cords with crossed orientation and/or substantially parallel to the direction of circumferential extension of the tyre.

A tread band 10 is applied to the belt structure 9 in a radially outer position thereof, the tread band 10 being of elastomeric material as well.

Moreover, respective sidewalls 11 of elastomeric material are applied on the side surfaces of the carcass structure 2, each one extending from one of the side edges 10a of the tread band 10 up to the respective annular anchoring structure 4 to the beads 5.

Figure 2:
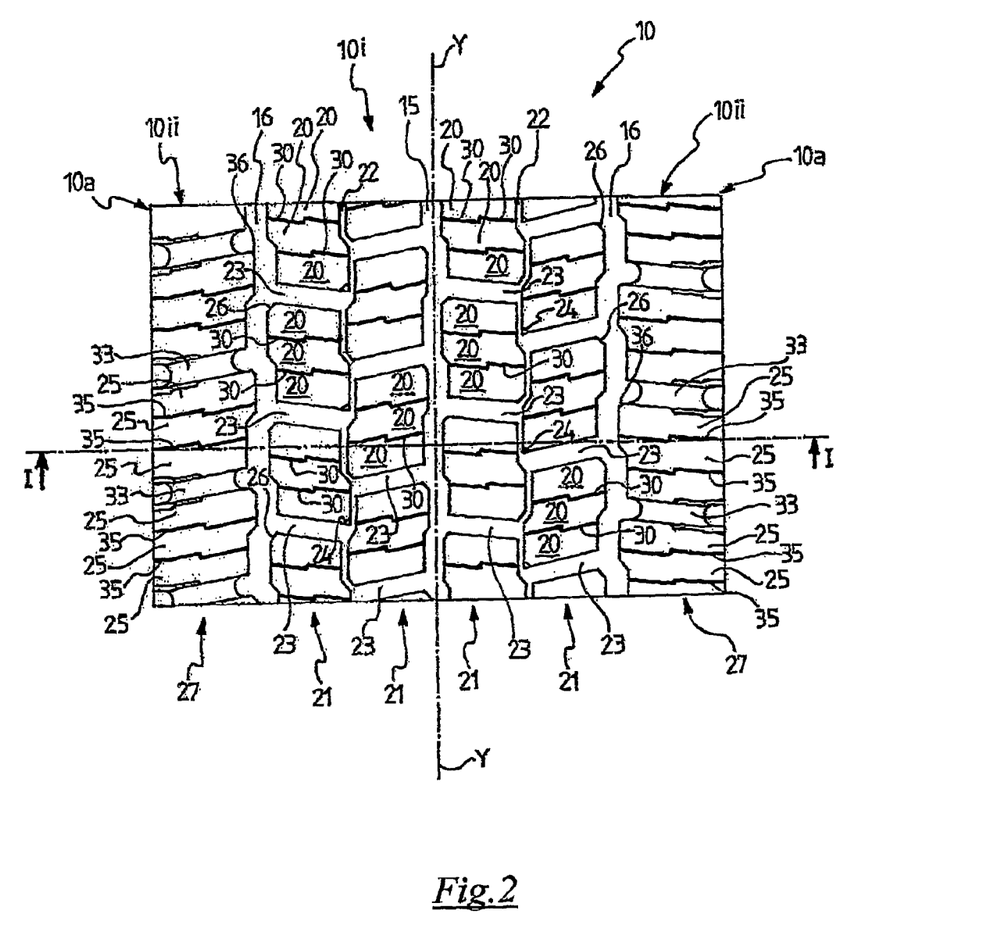
FIG. 2 shows a plan development of a portion of the tread band of the tyre of FIG. 1.
Figure 3:
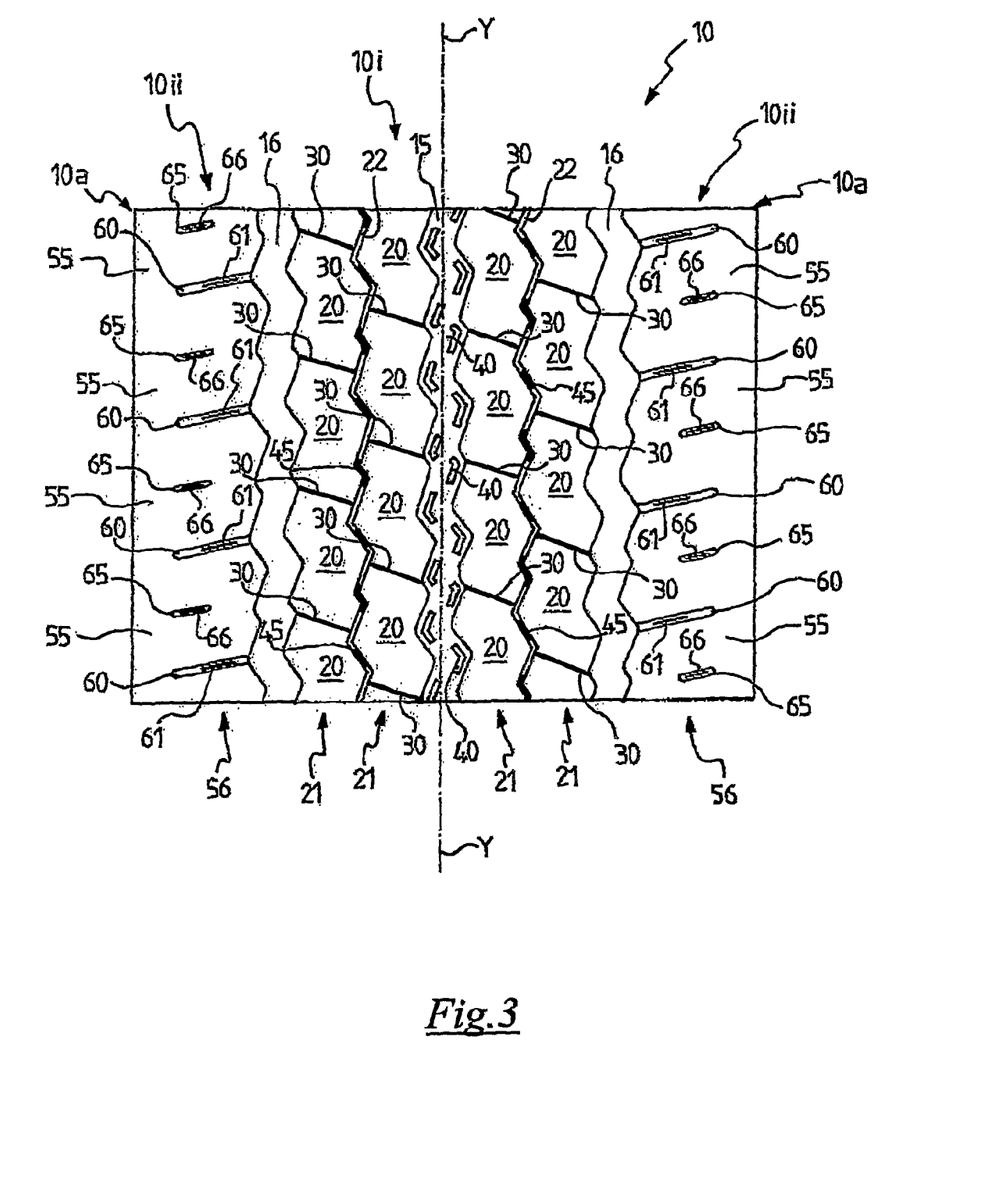
FIG. 3 shows a plan development of a portion of the tread band of a second embodiment of a tyre according to the invention.

With reference to the FIGS. 1-3, the tread band 10 comprises an annular central portion 10i astride the equatorial plane Y-Y of the tyre 1 and two opposite annular shoulder portions 10ii arranged in axially opposite sides with respect to the central annular portion 10i.

The annular central portion 10i of the tread band comprises a circumferential central groove 15 astride the equatorial plane Y-Y. Each annular shoulder portion 10ii is separated from the annular central portion 10i of the tyre 1 by a respective circumferential lateral groove 16.

The tread band 10 comprises, at the annular central portion 10i thereof, a plurality of blocks 20 arranged on opposite sides of the circumferential central groove 15 and the circumferential lateral grooves 16. In the following description, the blocks 20 will be indicated also with the expression: equatorial blocks.

With particular reference to FIGS. 2 and 3, the equatorial blocks 20 are arranged along circumferential rows 21 axially separated by respective circumferential sipes 22. In the specific example illustrated in FIGS. 2 and 3, two rows 21 of blocks 20 are provided at each zone of the annular central portion 10i comprised between the circumferential central groove 15 and each circumferential lateral groove 16.

Still at the annular central portion 10i thereof, the tread band 10 comprises a plurality of transversal sipes 30 interposed between circumferentially consecutive blocks 20.

The transversal sipes 30 extend along a direction substantially perpendicular to the equatorial plane Y-Y of the tyre 1. Throughout the present description and in the subsequent claims, with the expression: direction substantially perpendicular to the equatorial plane, it is meant a direction which forms an angle with the equatorial plane comprised between 70° and 110°.

The tread design illustrated in FIG. 2 will now be described in more detail. Such tread design is particularly adapted for being used in a winter tyre.

As illustrated in FIG. 2, the blocks 20 have a substantially parallelepiped shape, elongated in the axial direction.

The blocks 20 of each circumferential row 21 are grouped three by three, each group of blocks 20 comprising two transversal sipes 30 and being circumferentially separated from a consecutive group of blocks 20 of the same row 21 by a respective transversal groove 23. For the sake of clarity of illustration, the numeric reference 20 is associated only with some of the blocks, the numeric reference 30 is associated only with some of the transversal sipes and the numeric reference 23 is associated only with some of the transversal grooves.

Preferably, as illustrated in FIG. 2, the groups of blocks 20 of a circumferential row are at offset circumferential positions with respect to the groups of blocks 20 of the axially adjacent circumferential row 21. The circumferential grooves 16 and the circumferential sipes 22 preferably extend over the entire circumferential extension of the tyre 1 along a path forming a broken line defined by first circumferential sections parallel to the equatorial plane Y-Y and second circumferential sections inclines with respect to the equatorial plane Y-Y and joining the aforementioned first sections. In such a manner, the traction capability of the tread band 10 is advantageously increased in the forward direction of the tyre.

Preferably, some of the blocks 20 of the annular central portion 10i of the tread band 10 of the example of FIG. 2 have a bevelled corner 24 at the circumferential sipe 22. Other blocks 20 of the annular central portion 10i preferably have a bevelled corner 26 at the circumferential groove 16. Advantageously, the number of corners which could, due to their mobility, trigger irregular wear and noise phenomena is thus appropriately reduced.

Preferably, the maximum depth of the tread band 10 (and thus, the maximum depth of the circumferential central groove 15, of the circumferential lateral grooves 16, of the circumferential sipes 22 and of the transversal grooves 23) is comprised between about 10 mm and about 25 mm, such depth being more preferably equal to about 22.5 mm. The depth of the transversal sipes 30 is preferably between 20% and 100% of the maximum depth of the tread band 10.

In particularly preferred embodiment of a tyre of the present invention of the winter type, such as that illustrated in FIG. 2, the volume occupied by the blocks 20, or volume of the solids, in the annular central portion 10i of the tread band, in a portion of the tread band 10 having a length equal to the pitch of the tread design and a width equal to the axial extension of the tread band, is comprised between 60% and 85% of the overall volume of such annular central portion 10i (total volume). In the illustrated example, the ratio between the volume of solids and the total volume is equal to about 68%.

Preferably, the aforementioned tyre further comprises, at each of the two annular shoulder portions 10ii, a plurality of lateral blocks 25, also these being arranged along a respective circumferential row 27 comprised between the circumferential groove 16 and a respective end portion 10a of the tread band 10.

The lateral blocks 25 are grouped three by three, each block 25 of one group being separated from the circumferentially consecutive block of the same group by a lateral transversal sipe 35. Each group of blocks 25, in turn, is separated from the circumferentially consecutive group of blocks 25 by a lateral transversal groove 33.

The axial extension of the lateral blocks 25, of the lateral transversal sipes 35 and lateral transversal grooves 33 is greater than that, respectively, of the blocks 20, transversal sipes 30 and transversal grooves 23 of the central annular portion 10i of the tread band 10.

The groups of lateral blocks 25 are preferably offset in circumferential direction with respect to the groups of equatorial blocks 20 of the row 21 arranged on the opposite side with respect to the circumferential groove 16.

Preferably, some of the lateral blocks 25 have a bevelled corner 36 at the circumferential groove 16.

The tread design illustrated in FIG. 3 is now described in more detail. Such tread design is particularly adapted for being used in a city tyre.

The tread design of FIG. 3 differs from that of FIG. 2 only in the features discussed below.

The blocks 20 preferably have a substantially parallelepiped shape, elongated in the circumferential direction and all of them are separated from circumferentially consecutive blocks 20 by a respective transversal sipe 30. Comparing the tread design of FIG. 3 with that of FIG. 2, it is noted how in the tread design of FIG. 3 circumferentially consecutive groups of blocks comprised between transversal sipes corresponding to the transversal sipes 23 of the tread design of FIG. 2 are not identifiable.

The transversal sipes 30 have an inclination, with respect to the equatorial plane Y-Y of the tyre 1, preferably greater than that of the sipes of the tread design of FIG. 2. More preferably, the angle of inclination of the transversal sipes 20 of the tread design of FIG. 3 with respect to the equatorial plane Y-Y of the tyre is comprised between 60° and 120°.

Preferably, the blocks 20 of a circumferential row 21 are at offset circumferential positions with respect to the blocks 20 of the axially adjacent circumferential row 21.

The central circumferential groove 15 preferably comprises a plurality of ribs 40, extended from the bottom thereof, intended both to prevent the trigger of tearing in the rubber composition and to protect the underlying belt structure. The circumferential sipes 22 preferably comprise portions 35 of greater depth.

The circumferential grooves 16 and the circumferential sipes 22 preferably extend over the entire circumferential extension of the tyre 1 along a path forming a broken line having a substantially zigzag progression, so as to give to an improved traction capability to the tyre in the forward direction.

Preferably, the maximum depth of the circumferential central groove 15 and of the circumferential lateral grooves 16 is for example about 19.5 mm, while that of the circumferential sipes 22 is preferably about 8 mm. The depth of the transversal sipes 30 is preferably lower than or equal to about 14 mm.

In the example shown in FIG. 3 of a tyre of the present invention of the city type, the ratio between the volume of solids and the total volume is equal to about 78%.

Preferably, the aforementioned tyre further comprises, at each of the two annular shoulder portions 10ii thereof, a plurality of lateral blocks 55, also these being arranged along a respective circumferential row 56 comprised between the circumferential groove 16 and a respective end portion 10a of the tread band 10.

The lateral blocks 55 are defined by lateral transversal sipes 60, preferably having a depth lower than or equal to about 7 mm.

Each block 55 in turn comprises a respective transversal sipe 65 having an axial size lower than that of the lateral transversal sipes 60.

Preferably, the lateral transversal sipes 60 and the transversal sipes 65 comprise respective ribs 61 and 66 extended from the bottom thereof.

The axial extension of the lateral sipes 65 and transversal sipes 60 is respectively greater than that of the blocks 20 and of the transversal blocks 30 of the central annular portion 10i of the tread band 10.

The lateral blocks 25 are preferably offset in circumferential direction with respect to the equatorial blocks 20 of the row 21 arranged on the opposite side with respect to the circumferential groove 16.

Going back now to the tread design of FIG. 2, the transversal sipes 30 of the annular central portion 10i and the lateral transversal sipes 35 of the annular shoulder portions 10ii of the tread band 10 are identical in shape. For an easier discussion and reading, throughout the present description the shape of such transversal sipes will be described making explicit reference to the transversal sipes 30 of the annular central portion 10i of the tread band 10, it being understood that what said is also applicable to the transversal sipes 35 of the annular should portion 10ii of the tread band 10.

Figure 4:
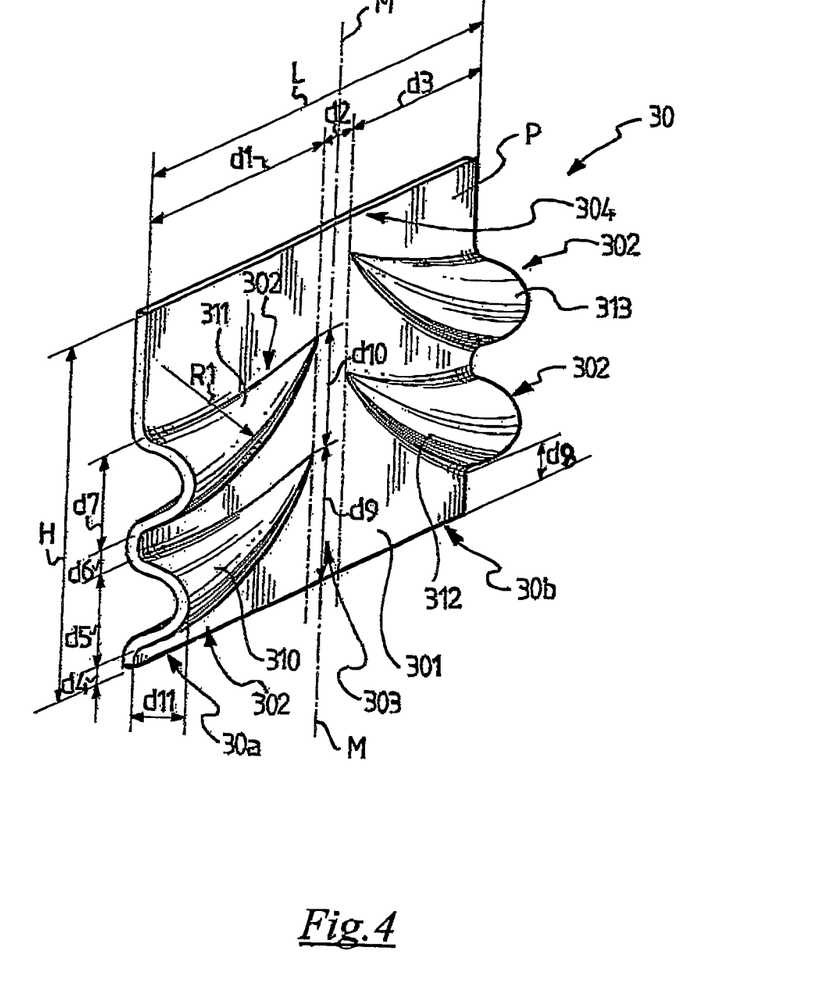
FIG. 4 shows a perspective view of a first embodiment of a transversal sipe usable in the tread band of FIGS. 2 and 3.
Figure 5:
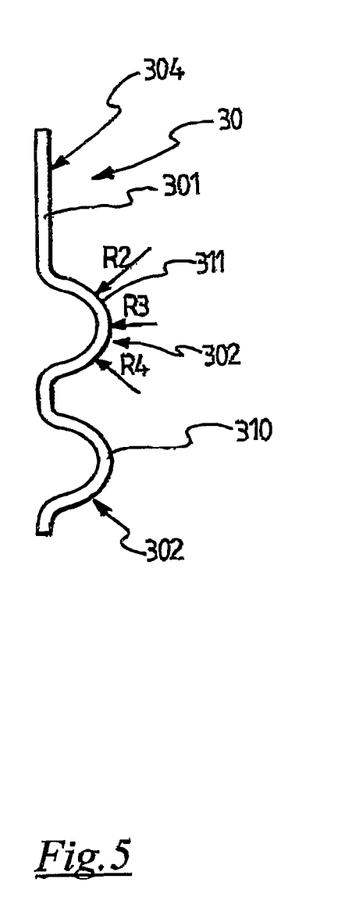
FIG. 5 shows a side view of the sipe of FIG. 4.

FIGS. 4 and 5 show a preferred embodiment of a mould portion adapted to make in the tyre a transversal sipe 30 of the tread band 10 illustrated in FIG. 2.

In the following description, for an easier description, "ripe" indicates and represents both the sipe obtained on the tread design and the portion of the mould adapted to obtain the sipe. In fact it should be noted that the surfaces of the aforementioned mould portion are perfectly matched to the surfaces of the obtained sipe.

With particular reference to FIG. 4, the sipe 30 comprises a main surface 301 having a predetermined radial extension (or depth) H and a predetermined axial extension (or length) L. As already anticipated, the depth H is preferably comprised between 20% and 100% of the maximum depth of the tread band 10, while the length L is preferably equal to that of the equatorial blocks 20.

The main surface 301 is preferably flat and has four deformations 302 extended in a substantially perpendicular direction to a lying plane P of the main surface 301. The deformations 302 are advantageously adapted to define, in the two blocks 20 circumferentially adjacent to the transversal block 30, respective portions of mutual embedding.

The number of deformations 302 of the main surface 301 can also be different from four, a number of deformations between four and ten being anyway preferred, in order to improve the embedding between the blocks 20 which are circumferentially adjacent to the transversal spire 30.

The deformations 302 are defined by a first pair of bent portions 310 and 311 placed side by side in the radial direction and by a second pair of bent portions 312 and 313 also placed side by side in the radial direction and axially arranged on the opposite side to the bent portions 310, 311 with respect to a centre plane M of the transversal sipe 30.

Preferably, the bent portions 310, 311, 312, 313 all have the same shape and the same sizes.

The bent portions 310 and 311 extend on a same side of the main surface 301 of the transversal sipe 30. Analogously, the bent portions 312 and 313 extend on a same side of the main surface 301 of the transversal sipe 30, such side being the same on which the bent portions 310 and 311 extend.

In an alternative embodiment of the transversal sipe 30, not illustrated, the bent portions 312 and 313 extend on a side of the main surface 301 opposite that on which the bent portions 310 and 311 extend.

In a further alternative embodiment of the transversal sipe 30, not illustrated, the bent portions 310 and 312 extend on a same side of the main surface 301, while the bent portions 311 and 313 extend on a side of the main surface 301 opposite that on which the bent portions 310 and 312 extend.

Preferably, the position of the bent portions 312 and 313 on the main surface 301 is offset, in the radial direction, with respect to that of the bent portions 310 and 311, so as to stiffen the tyre against the lateral stresses. Such characteristic is conveniently shown in FIG. 4, where it can be seen how at one axial end 30a of the transversal sipe 30, the radially inner end of the bent portion 310 is distant from the radially inner end of the transversal sipe 30 by a distance d4, while at the opposite axial end 30b of the transversal sipe 30, the radially inner end of the bent portion 312 is distant from the radially inner end of the transversal sipe 30 by a distance d8 which is greater than d4. Advantageously, the aforementioned offset contributes to the stiffening of the tyre against the lateral stresses.

Each bent portion 310, 311, 312, 313 extends axially on the main surface 301 of the transversal sipe 30 at a respective surface portion having an axial extension d1, d3 preferably comprised between the 30% and 70% of the axial dimension L of the sipe. Therefore, the main surface 301 of the transversal sipe 30 has a central zone 303 which is not affected by the deformations 302. Preferably, the aforementioned central zone 303 has an axial dimension d2 comprised between about 1 mm and about 10 mm.

Moreover, preferably, the bent portions 310, 311, 312, 313 extend on the main surface 301 of the transversal sipe 30 so as not to affect a radially outer portion 304 of such main surface 301.

Advantageously, at the central zone 303 and radially outer portion 304 of the main surface 301, the maximum opening of the transversal sipe 30 is achieved, therefore attaining an optimal trapping of the snow at such zones.

For an easier discussion and reading, due to the preferred shape and size identity of the bent portions 310, 311, 312 and 313, throughout the present description preferred shape and size of such bent portions are described in detail making specific reference to the bent portion 310 and possibly to the bent portion 311, it being clear that what said is applicable also to the other bent portions.

The bent portions 310 and 311 (and therefore also the bent portions 312 and 313) have, at the axial end 30a of the transversal sipe 30, a radial extension indicated in FIG. 4 with, respectively, d5, d7 and having a value preferably comprised between about 10 mm and about 80 mm.

The bent portions 310 and 311 are spaced apart by a main surface portion 301 having a radial size d6 preferably greater than or equal to about 2 mm.

The bent portion 310 is defined by a curved surface portion having a width in a circumferential direction which progressively decreases, moving axially from the axial end 30a of the transversal sipe 30 towards a central zone 303 of the sipe 30, with a curvature radius R1 preferably comprised between about 10 mm to about 80 mm.

Preferably, the width d11 at the axial end 30a of the transversal sipe 30 has a value comprised between about 1 mm and about 4 mm, such width being progressively reduced in a circumferential direction moving from the axial end 30a of the transversal sipe 30 towards its central zone 303. In practice, the bent portion 310 has a shape substantially of a nail.

Preferably, the bent portion 310 extends radially more towards the radially outer zone 304 of the main surface 301, proceeding from the axial end 30a of the transversal sipe 30 towards the central zone 303. Such characteristic is made evident in FIG. 4 by the fact that the radially inner end of the bent portion 310, at the boundary with the central zone 303 of the sipe 30 (such boundary being indicated in FIG. 4 by the vertical dotted line) has a radial distance d9 from the radially inner end of the transversal sipe 30 greater than the sum of d4 and d5. Analogously, the radially inner end of the bent portion 311, at the boundary with the central zone 303 of the sipe 30, has a radial distance d10 from the radially inner end of the bent portion 310 greater than the sum of d6 and d7. Advantageously, the surface extension of the embedding between the blocks 20 circumferentially adjacent to such sipe is thus increased, axial extension of the transversal sipe 30 being equal, with important advantages in terms of lateral stability of the tyre.

With particular reference to FIG. 5, the bent portions 310 and 311 have in cross section a shape defined by three arcs of curved surfaces respectively having curvature radii R2, R3 and R4, where R2 is preferably equal to R4 and R3 preferably has a value comprised between 0.3 and 3 mm.

Figure 6:
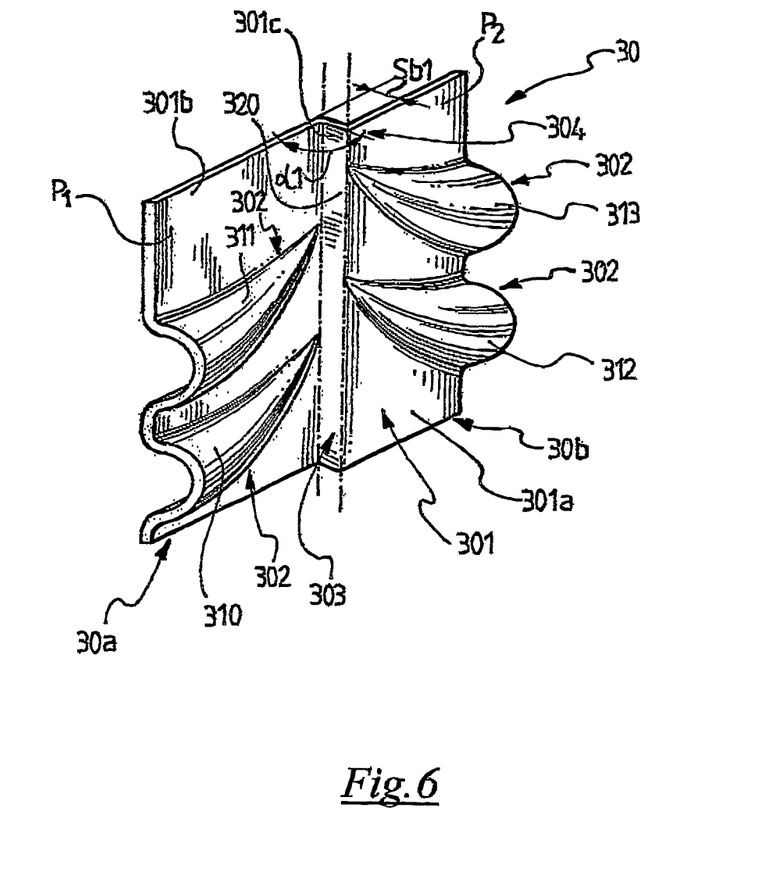
FIG. 6 shows a perspective view of an alternative embodiment of a transversal sipe usable in the tread band of FIGS. 2 and 3.

FIG. 6 shows an alternative embodiment of the transversal sipe 30. Such embodiment differs from that of FIGS. 4 and 5 only in that the main surface 301 has, at the central zone 303 thereof, a deviated portion 320. Such deviated portion 320, in particular, is defined by a central portion 301c of main surface 301 inclined by a predetermined angle α1 with respect to two opposite lateral portions 301a and 301b of main surface 301 lying on respective planes P1 and P2, which are parallel to each other. The angle α1 is preferably comprised between 90° and 140° and the extension sb1 of the central portion 301c of main surface 301 (and therefore the width of the deviated portion 320) preferably has a value comprised between about 1 mm and about 10 mm. In practice, due to the deviated portion 320, the pairs of bent portions 310, 311 and 312, 313 are placed at circumferentially offset positions.

Advantageously, the deviated portion 320 makes a constraint between the circumferentially consecutive blocks against the lateral stresses, giving lateral stability to the tyre, and increases the surface extension of the central zone 303 of the sipe, allowing a greater accumulation of snow in such zone of the sipe.

Figure 7:
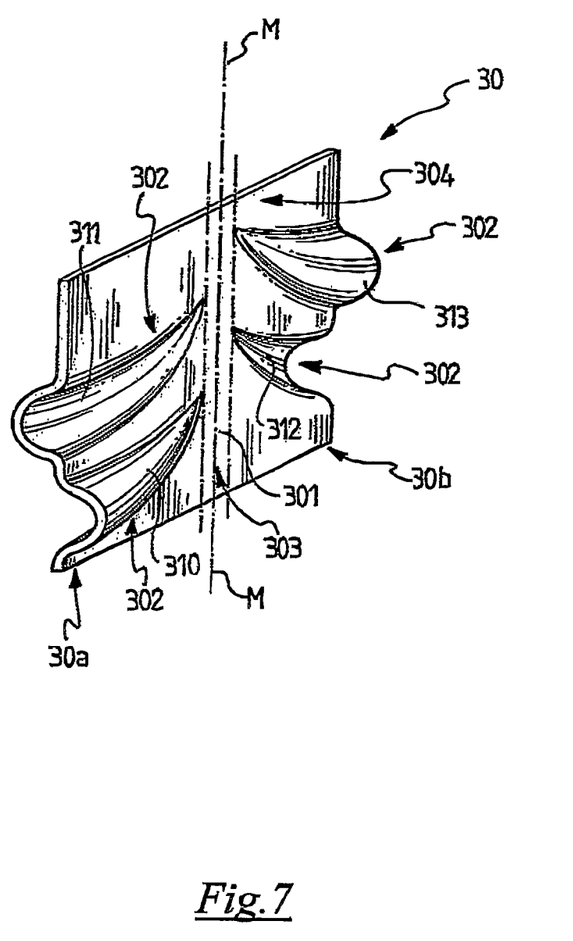
FIG. 7 shows a perspective view of a further alternative embodiment of a transversal sipe usable in the tread band of FIGS. 2 and 3.

FIG. 7 shows a further alternative embodiment of the transversal sipe 30. Such embodiment differs from that of FIG. 4 only in that the bent portions of each pair of bent portions 310, 311 and 312, 313 extend on opposite sides of the main surface 301 of the transversal sipe 30. In particular, in the specific example illustrated herein, the bent portions 310 and 313 extend on the same side of the main surface 301, while the bent portions 311 and 312 extend on the opposite side of the main surface 301.

Figure 8:
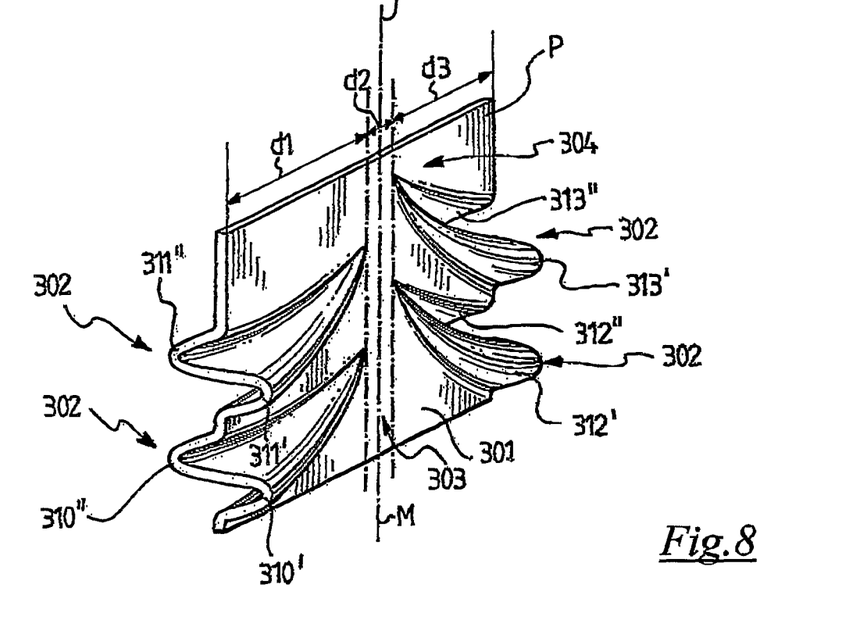
FIG. 8 shows a perspective view of a further alternative embodiment of a transversal sipe usable in the tread band of FIGS. 2 and 3.
Figure 9:
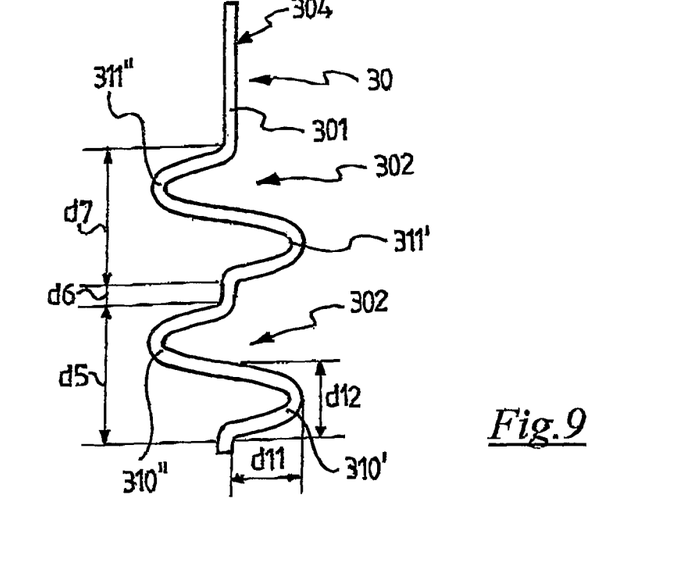
FIG. 9 shows a side view of the sipe of FIG. 8.

FIGS. 8 and 9 show a further alternative embodiment of the transversal sipe 30. Such embodiment differs from that of FIG. 4 only in that each bent portion 310, 311, 312 and 313 is defined by a pair of bent portions placed side by side, which are contiguous in a radial direction and extended on opposite sides of the main surface 301 of the sipe 30, such pairs of bent portions being respectively indicated with 310', 310'', 311', 311'', 312', 312'', 313', 313''.

As illustrated in FIG. 9, each pair of bent portions 310', 310'' has an axial section d5 equal to that of the bent portion 310 of the embodiment of FIG. 4, and is spaced apart from the radially adjacent pair of bent portions 311', 311'' by portion of main surface 301 having a radial extension d6 equal to that of the portion which separates the bent portions 310 and 311 of the embodiment of FIG. 4. FIG. 9 also shows how each pair of bent portion 311', 311'' has an axial extension d7 equal to that of the bent portion 311 of the embodiment of FIG. 4. Moreover, each bent portion 310', 310'' has a width d11 in the circumferential direction equal to that of the bent portion 310 of the embodiment of FIG. 4 and a radial extension d12 equal to about half the radial extension d5 of the bent portion 310 of the embodiment of FIG. 4.

Figure 10:
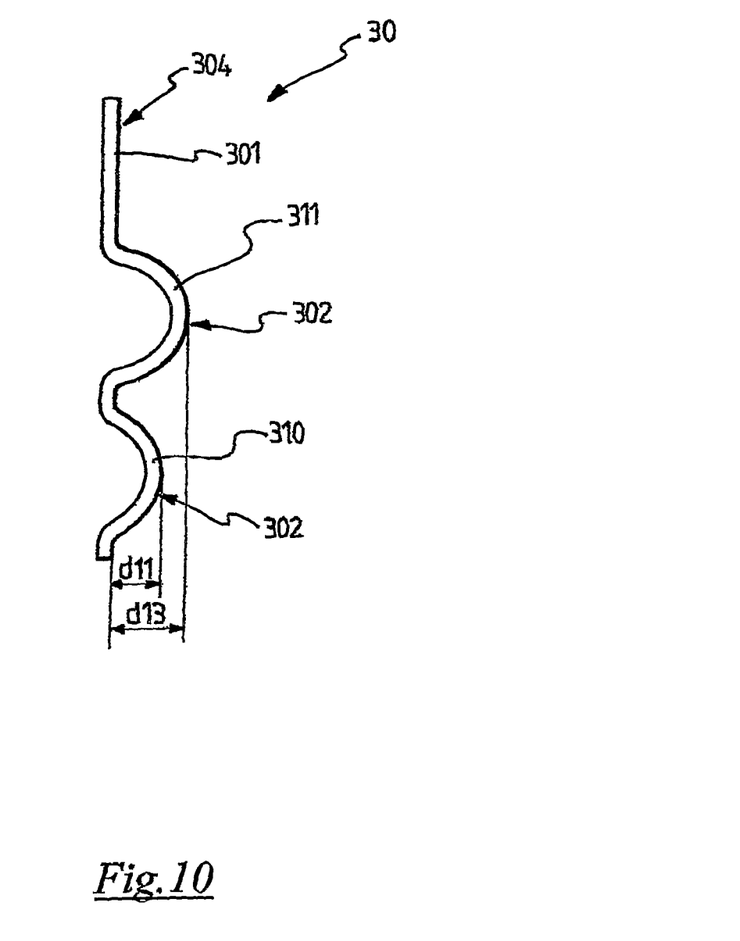
FIG. 10 shows a side view of a further embodiment of a transversal sipe usable in the tread band of FIGS. 2 and 3.

FIG. 10 shows a further alternative embodiment of the transversal sipe 30. Such embodiment differ from that of FIG. 4 only in that the radially inner bent portion 310 (and analogously the radially inner bent portion 312, not visible in FIG. 10) has an extension d11 in the circumferential direction which is lower than the extension d13 of the radially outer bent portion 311 (and analogously of the radially outer bent portion 313, not visible in FIG. 10), so as to make a greater embedding at the radially outermost portions of the transversal sipe 30 and a lower embedding at the radially inner portions of the sipe 30. Such configuration advantageously allows attaining, when the tyre is new and thus when the radial extension and mobility of the blocks is high, the maximum embedding between the walls of the circumferentially consecutive blocks 20, such embedding being steadily reduced as the tread band, being worn, exhibits portions of stiffer blocks on the outer peripheral surface thereof.

In an alternative embodiment of the present invention, not illustrated, the deformation of the main surface of the transversal sipe 30 comprises a succession, in the axial direction, of embossing portions having a circumferential width which can vary in an oscillating manner from a minimum to a maximum between the axial end of the sipe and the central zone thereof, each embossing portion in any case having a maximum width progressively decreasing from the axial end of the transversal sipe 30 towards its central zone. The shape of the embossing portion can be of various type, for example prismatic, pyramid, circular, conical etc.

What has been stated above with reference to the shape of the transversal sipes 30 of the annular central portion 10i of FIG. 2 is also valid for the transversal sipes 30 of the central annular portion 10i of the tread band 10 of FIG. 3. However, unlike the annular shoulder portions 10ii of the tread band of FIG. 2, which as stated above have lateral transversal sipes 35 having a shape equal to that of the transversal sipes 30 of the annular central portion 10i, the lateral transversal sipes 60 of the annular shoulder portions 10ii of the tread band 10 of FIG. 3 have a shape which is different from that of the transversal sipes 30 of the annular central portion 10i, such shape being in particular of conventional type.

The tread design illustrated in FIGS. 2 and 3 are only examples of a high number of tread designs which can be effectively made according to specific requirements. In particular, the number of blocks, transversal sipes, circumferential sipes, transversal grooves (if present), circumferential grooves, rows of blocks and possible the number of blocks of each group of blocks (if present), the circumferential position of the blocks of one row with respect to that of the blocks of the axially adjacent row and/or the circumferential position of the blocks of the annular central portion of the tyre with respect to that of the blocks of the annular shoulder portions of the tyre can vary according to the intended specific use of the tyre, thus obtaining a tread design which is different from that illustrated in FIGS. 2 and 3 but which is always within the scope of protection defined by the following claims. Tread designs can also be provided without the central groove 15, or with blocks, circumferential and transversal grooves (if present) and circumferential sipes of a shape and/or size different from those described above with reference to FIGS. 2 and 3. Also the inclination of the transversal sipes with respect to the equatorial plane Y-Y can be different from that illustrated in FIGS. 2 and 3, always remaining within the scope of protection defined by the following claims.

Obviously, a man skilled in the art can make further modifications and variants in order to satisfy specific and contingent requirements, variants and modifications which are still within the scope of protection as defined by the following claims.

The invention claimed is:

1. A tyre for a vehicle wheel, having a tread band comprising an annular central portion astride an equatorial plane and two annular shoulder portions arranged on axially opposite sides with respect to the annular central portion, the annular central portion being separated from each annular shoulder portion by a respective circumferential groove, wherein the annular central portion comprises a plurality of blocks arranged along at least one circumferential row between two circumferential grooves, and at least one transversal sipe capable of being adapted to define two circumferentially consecutive blocks, wherein the transversal sipe has a main surface oriented in a substantially radial direction and provided with at least one deformation defining, in adjacent circumferentially consecutive blocks, respective portions of mutual constraint, wherein said deformation has an overall decreasing width from an axial end of the sipe to a central zone thereof, wherein said deformation has a radial extension smaller than that of said main surface and extends radially more outwardly proceeding from the axial end of the sipe toward the central zone thereof.

2. The tyre according to claim 1, wherein the main surface is flat.

3. The tyre according to claim 1, wherein the main surface comprises a deviated portion at the central zone thereof.

4. The tyre according to claim 1, wherein a radially outer portion of the main surface of the transversal sipe is not affected by the deformation.

5. The tyre according to claim 1, wherein the central zone of the main surface of the transversal sipe is not affected by the deformation.

6. The tyre according to claim 1, wherein the deformation comprises at least one bent portion having a progressively decreasing width from the end of the sipe to the central zone thereof.

7. The tyre according to claim 6, wherein the deformation comprises a pair of bent portions placed side by side, which are radially spaced apart from one other and extended on a same side of the main surface of the sipe.

8. The tyre according to claim 6, wherein the deformation comprises a pair of bent portions placed side by side, which are radially spaced apart from one other and extended on opposite sides of the main surface of the sipe.

9. The tyre according to claim 6, wherein the deformation comprises a pair of bent portions placed side by side, which are radially contiguous and extended on opposite sides of the main surface of the sipe.

10. The tyre according to claim 6, wherein the deformation comprises two pairs of bent portions placed side by side, each pair comprising two radially contiguous bent portions extended on opposite sides of the main surface of the sipe, the two pairs being radially spaced apart from one other.

11. The tyre according to claim 7, wherein the bent portions of said pair of bent portions placed side by side have a different circumferential width.

12. The tyre according to claim 11, wherein a radially innermost bent portion has a width lower than that of a radially outermost bent portion.

13. The tyre according to claim 1, wherein the deformation comprises a succession of embossed portions having a decreasing width from the end of the sipe to the central zone thereof.

14. The tyre according to claim 1, wherein the main surface of the transversal sipe comprises at least two deformations, each one extended from one of the axial ends of the transversal sipe to the central zone.

15. The tyre according to claim 14, wherein the deformations extended from opposite ends are provided at offset radial positions.

16. The tyre according to claim 1, wherein the deformation is defined by a curved surface.

17. The tyre according to claim 1, comprising at least two circumferential rows of blocks in said annular central position, said at least two circumferential rows of blocks being axially separated by a circumferential sipe.

18. The tyre according to claim 17, comprising a first circumferential groove astride said equatorial plane and two second circumferential grooves arranged on axially opposite sides with respect to the first circumferential groove, said at least two circumferential rows of blocks being arranged between the first circumferential groove and each of the second circumferential grooves.

19. The tyre according to claim 1, wherein the blocks of said at least one circumferential row are grouped together, each group being separated from a circumferentially consecutive group by a respective transversal groove.

20. The tyre according to claim 19, wherein the blocks are elongated in an axial direction.

21. The tyre according to claim 19, comprising a first circumferential groove astride said equatorial plane and two second circumferential grooves arranged on axially opposite sides with respect to the first circumferential groove, said at least two circumferential rows of blocks being arranged between the first circumferential groove and each of the second circumferential grooves, wherein the groups of blocks of a circumferential row are at offset circumferential positions with respect to the groups of blocks of an axially adjacent circumferential row.

22. The tyre according to claim 1, wherein each of two annular shoulder portions comprise sipes with a shape identical to, and a width different from, the sipes of the central annular portion of the tread band.

23. The tyre according to claim 1, comprising a transversal sipe between each block of said at least one circumferential row and the circumferentially consecutive block.

24. The tyre according to claim 23, wherein the blocks are elongated in a circumferential direction.

25. The tyre according to claim 23, comprising a first circumferential groove astride said equatorial plane and two second circumferential grooves arranged on axially opposite sides with respect to the first circumferential groove, said at least two circumferential rows of blocks being arranged between the first circumferential groove and each of the second circumferential grooves, wherein the blocks of a circumferential row are at offset circumferential positions with respect to the blocks of an axially adjacent circumferential row.

* * * * *